US010647169B1

(12) United States Patent
Castriotta et al.

(10) Patent No.: US 10,647,169 B1
(45) Date of Patent: May 12, 2020

(54) TIRE PRESSURE MANAGEMENT SYSTEM

(71) Applicant: Airgo IP, LLC, Oklahoma City, OK (US)

(72) Inventors: Sascha Castriotta, Oklahoma City, OK (US); Joseph S. Cappello, Oklahoma City, OK (US)

(73) Assignee: Airgo IP, LLC, Oklahoma City, OK (US)

(*) Notice: Subject to any disclaimer, the term of this patent is extended or adjusted under 35 U.S.C. 154(b) by 0 days.

(21) Appl. No.: 16/389,342

(22) Filed: Apr. 19, 2019

Related U.S. Application Data

(63) Continuation-in-part of application No. 15/623,878, filed on Jun. 15, 2017, now abandoned, which is a continuation-in-part of application No. 15/388,092, filed on Dec. 22, 2016, now Pat. No. 10,005,325, which is a continuation-in-part of application No. 15/087,458, filed on Mar. 31, 2016, now Pat. No. 10,086,660.

(51) Int. Cl.
*B60C 23/00* (2006.01)

(52) U.S. Cl.
CPC ................ *B60C 23/003* (2013.01)

(58) Field of Classification Search
CPC .................................... B60C 23/003
USPC ......................................... 152/417
See application file for complete search history.

(56) References Cited

U.S. PATENT DOCUMENTS

| | | |
|---|---|---|
| 1,072,907 A | 9/1913 | Brooks |
| 1,083,847 A | 1/1914 | McDowell et al. |
| 1,165,057 A | 12/1915 | Bayly |
| 1,205,504 A | 11/1916 | Bearce |
| 1,827,662 A | 10/1931 | Maas |
| 2,156,841 A | 5/1939 | Davis |
| 2,177,042 A | 10/1939 | Michael |
| 2,242,207 A | 5/1941 | Bowers |
| 2,657,731 A | 11/1953 | Gazzoli |
| 2,849,047 A | 8/1958 | Lamont et al. |
| 29,766,606 | 3/1961 | Huet |
| 3,276,503 A | 10/1966 | Kilmarx |
| 3,367,722 A | 2/1968 | Miyanaga |
| 3,705,614 A | 12/1972 | Juttner et al. |
| 3,838,717 A | 10/1974 | Wolf |
| 3,933,397 A | 1/1976 | Hood |
| 4,154,279 A | 5/1979 | Tsuruta |

(Continued)

FOREIGN PATENT DOCUMENTS

DE 202015105702 1/2017

*Primary Examiner* — Kip T Kotter
(74) *Attorney, Agent, or Firm* — Hall Estill Attorneys at Law

(57) ABSTRACT

A tire pressure management system includes at least an axle, a hubcap supported by the axle and having an interior and an exterior, a rotary union mounted to the hubcap. The rotary union includes at least rotary union housing providing a central bore, a fluid conduit having upstream and downstream ends, a first bearing and a second bearing. Each of the bearings are in contact engagement with the fluid conduit via an inner race, and in sliding engagement with a bearing sleeve via an outer race. The bearing sleeve in pressing contact with the central bore; and a first and second seal, the first seal is disposed between the first bearing and the downstream end of the fluid conduit, the second seal adjacent the interior of the hubcap and disposed between the external surface of the fluid conduit and the internal surface of the central bore.

19 Claims, 14 Drawing Sheets

(56) References Cited

U.S. PATENT DOCUMENTS

| | | |
|---|---|---|
| 4,387,931 A | 6/1983 | Bland |
| 4,582,107 A | 4/1986 | Scully |
| 4,641,698 A | 2/1987 | Bitonti |
| 4,685,501 A | 8/1987 | Williams |
| 4,805,681 A | 2/1989 | Vollmer et al. |
| 4,844,138 A | 7/1989 | Kokubu |
| 4,883,106 A | 11/1989 | Schultz et al. |
| 4,924,926 A | 5/1990 | Schultz et al. |
| 5,080,156 A | 1/1992 | Bartos |
| 5,080,157 A | 1/1992 | Oerter |
| 5,174,839 A | 12/1992 | Schultz et al. |
| 5,236,028 A | 8/1993 | Goodell et al. |
| 5,287,906 A | 2/1994 | Stech |
| 5,377,736 A | 1/1995 | Stech |
| 5,398,743 A | 3/1995 | Bartos |
| 5,429,167 A | 7/1995 | Jensen |
| 5,482,358 A | 1/1996 | Kuck |
| 5,492,393 A | 2/1996 | Peisker et al. |
| 5,538,062 A | 7/1996 | Stech |
| 5,558,408 A | 9/1996 | Naedler et al. |
| 5,584,949 A | 12/1996 | Ingram |
| 5,735,364 A | 4/1998 | Kinoshita |
| 5,752,746 A | 5/1998 | Perry |
| 5,767,398 A | 6/1998 | Naedler |
| 5,769,979 A | 6/1998 | Naedler |
| 6,105,645 A | 8/2000 | Ingram |
| 6,145,559 A | 11/2000 | Ingram, II |
| 6,244,316 B1 | 6/2001 | Naedler |
| 6,435,238 B1 | 8/2002 | Hennig |
| 6,585,019 B1 | 7/2003 | Ingram |
| 6,968,882 B2 | 11/2005 | Ingram |
| 7,302,980 B2 | 12/2007 | Ingram |
| 7,418,989 B2 | 9/2008 | Ingram |
| 7,963,159 B2 | 6/2011 | Ingram et al. |
| 8,505,600 B2 | 8/2013 | Padula et al. |
| 2002/0124926 A1 | 9/2002 | Colussi et al. |
| 2004/0155516 A1 | 8/2004 | Colussi et al. |
| 2004/0187568 A1 | 9/2004 | Locatelli |
| 2005/0133134 A1 | 6/2005 | Ingram et al. |
| 2006/0179929 A1 | 8/2006 | Becker |
| 2012/0024445 A1 | 2/2012 | Wilson et al. |
| 2013/0199685 A1 | 8/2013 | Nelson et al. |

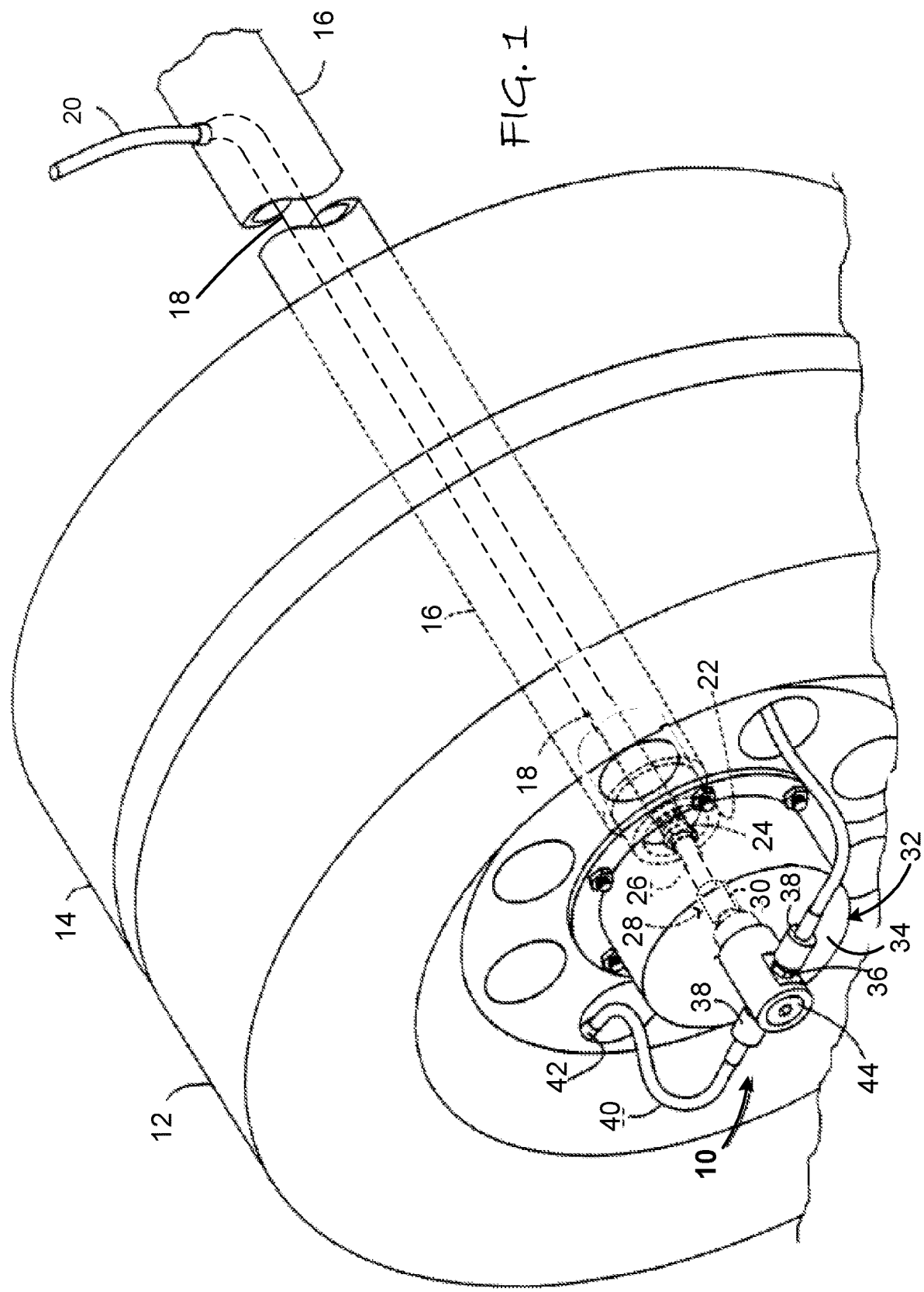

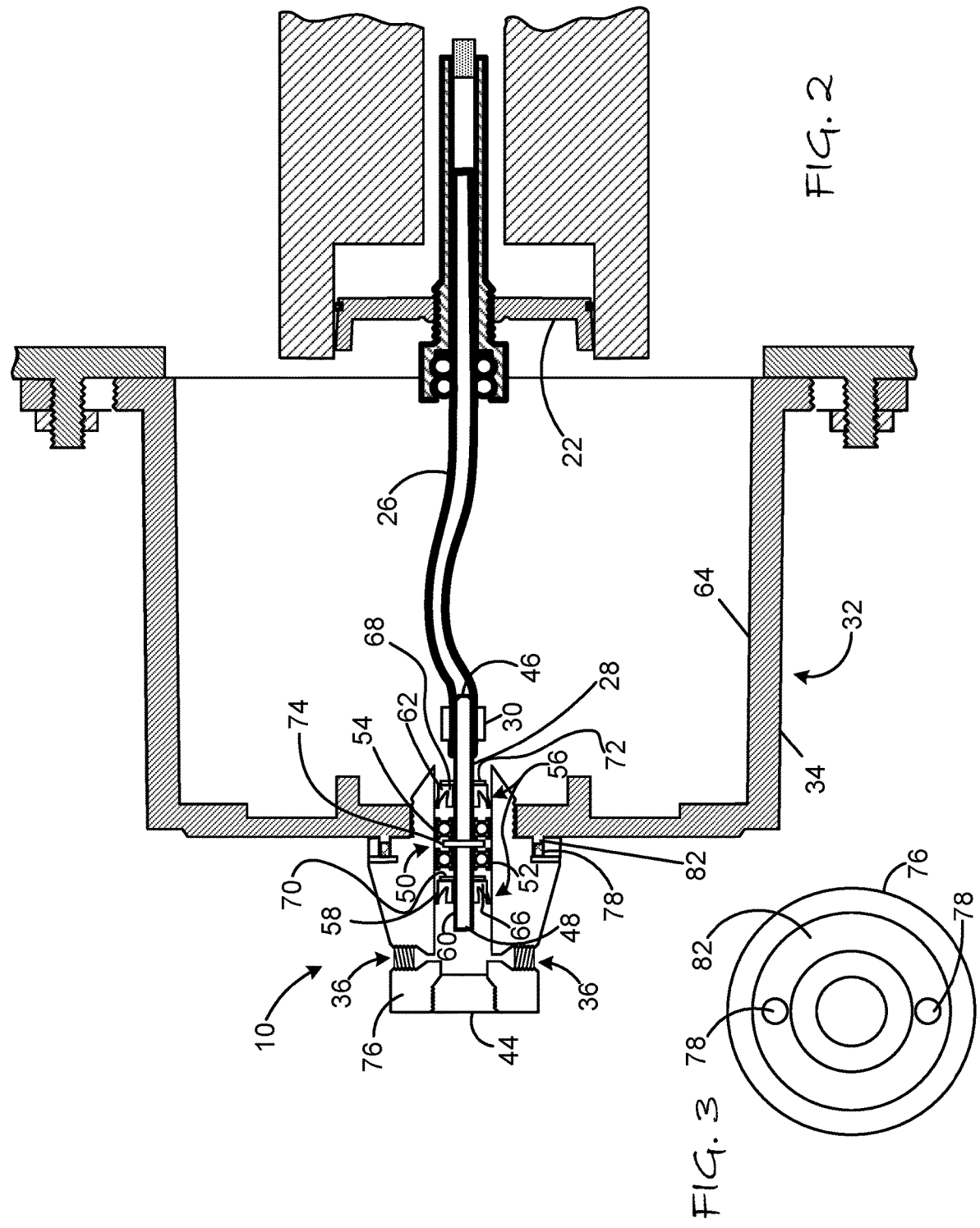

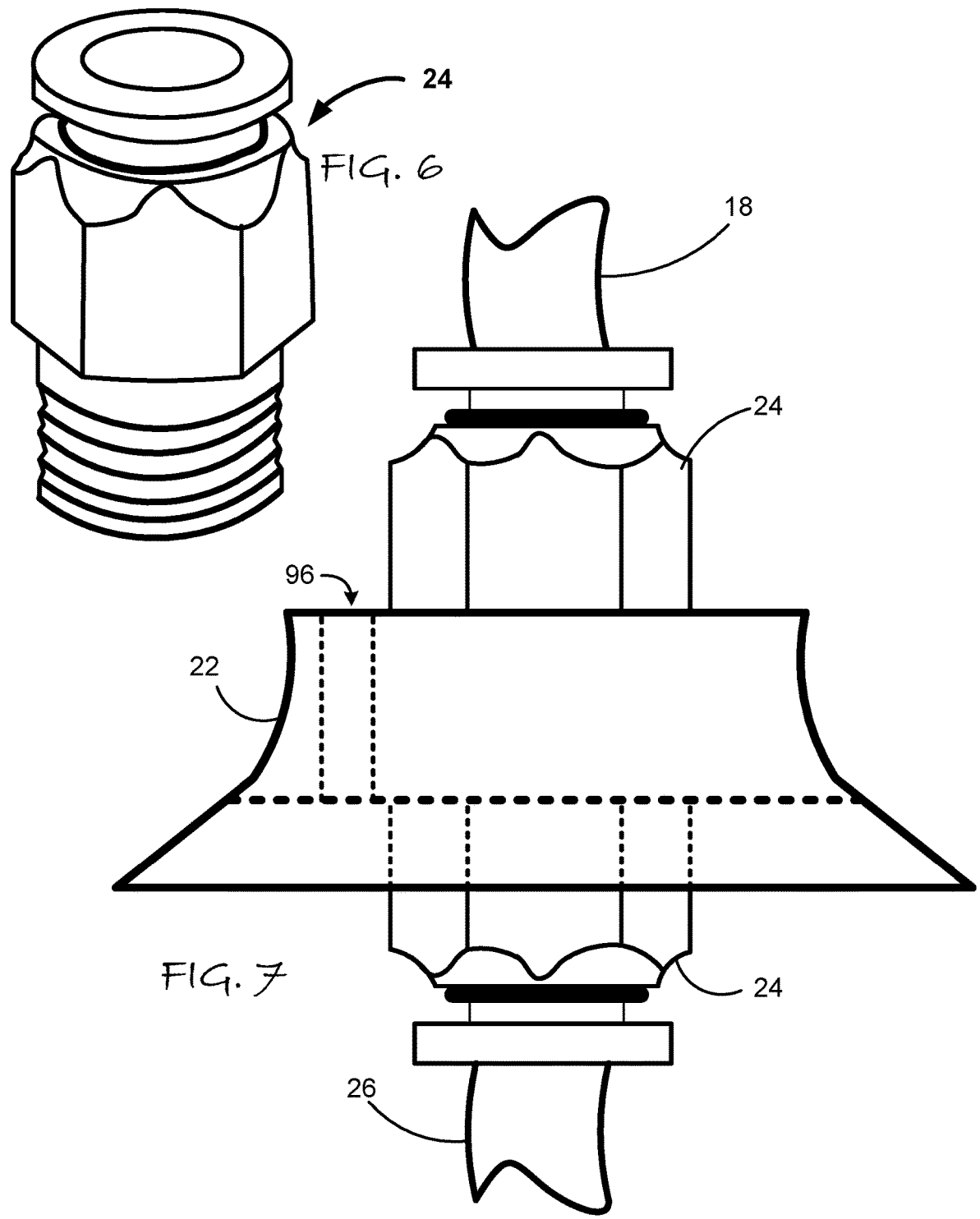

TIRE PRESSURE MANAGEMENT SYSTEM

CROSS REFERENCE TO RELATED APPLICATIONS

This application is a continuation-in-part of co-pending U.S. patent application Ser. No. 15/623,878 filed Jun. 15, 2017 entitled "Tire Pressure Management System" which is a continuation-in-part of U.S. patent application Ser. No. 15/388,092 filed Dec. 22, 2016 entitled, "Tire Pressure Management System," which issued as U.S. Pat. No. 10,005,325 on Jun. 26, 2018, which is a continuation-in-part of U.S. patent application Ser. No. 15/087,458 filed Mar. 31, 2016, entitled "Tire Pressure Management System," which issued as U.S. Pat. No. 10,086,640 on Oct. 2, 2018.

FIELD OF THE INVENTION

The present invention relates to the field of tire pressure maintenance. More particularly, the present invention relates to the management of tire pressure of tires supporting tractor trailers, even while the trailers are traveling along a roadway.

BACKGROUND OF THE INVENTION

The present invention relates to an improved rotary union for use in a central tire pressure management system for automatically maintaining the inflation pressure of the pneumatic tires on moving vehicles such as tractor trailers. Typically, tractor trailers utilize the air compressor on the tractor as a source of pressurized air to activate braking systems. The compressor directs air to the reserve air brake tank on the trailer, which generally corresponds to the range of typical inflation pressures in the tires used on trailers. Air from the reserve air brake tank is first directed to the braking system to maintain the air pressure in the braking system. In conventional tire inflation systems, excess air is directed from the tank through a pressure protection valve to a control box for the tire inflation system. The pressure protection valve only opens to direct the air to the control box when excess air pressure is present, thereby preventing air from being directed to the tire inflation system which is needed for the trailer braking system.

The control box contains a pressure regulator which is set to the cold tire pressure of the particular tires on the trailer so as to supply air to the tires at the desired pressure level in the event of a leak. Air is directed from the control box to the leaking tire through one of the trailer axles, which either carries an air line from the control box, or is sealed and functions as an air conduit. The pressurized air carried by the axles communicates with each pair of trailer tires mounted thereon through a rotary union assembly by which air flow is directed from a stationary air line to the valve stems on the rotating tires. Pressure responsive valves are employed between each rotary union assembly and its associated tires so that upon the occurrence of a leak in one of the tires, the resulting pressure loss will cause one of the valves to open and allow air flow from the rotary union assembly to pass therethrough to the leaking tire.

As tire inflation systems become adopted for broader uses, reliability and ease of maintenance, as well as an ability to manage under inflated as well as over inflated tires have emerged as important demands from the industry, accordingly improvements in apparatus and methods of installing tire inflation systems are needed and it is to these needs the present invention is directed.

SUMMARY OF THE INVENTION

In accordance with preferred embodiments, a tire pressure management system includes at least an axle housing enclosing a pressurized fluid, a hubcap supported by the axle and having an interior and an exterior, and a rotary union axially aligned with the axle and mounted to the hubcap from the exterior of the hubcap. Preferably, the rotary union including at least a rotary union housing providing a central bore, a fluid conduit, the fluid conduit having a downstream end and an upstream end, a pair of bearings, each of the pair of bearings providing an inner race and an outer race, each inner race of the pair of bearings is preferably in sliding contact with the fluid conduit, via the inner race, and in sliding contact with a bearing sleeve via an outer race. The bearing sleeve in pressing contact with the central bore. The first bearing of the pair of bearings is preferably adjacent the downstream end of said fluid conduit, and a second bearing of the pair of bearings is preferably adjacent the upstream end of the fluid conduit.

These and various other features and advantages that characterize the claimed invention will be apparent upon reading the following detailed description and upon review of the associated drawings.

BRIEF DESCRIPTION OF THE DRAWINGS

The present invention is illustrated by way of example and not limitation in the figures of the accompanying drawings, in which like references indicate similar elements and in which:

FIG. 1 is a partial perspective view of a rotary union assembly of the present novel tire pressure management system shown secured to an outer wheel of a pair of tractor trailer tires mounted on a stationary axle.

FIG. 2 is a sectional side view of the rotary union assembly of the present novel tire pressure management system and associated axle spindle.

FIG. 3 is bottom plan view of the rotary union assembly of the present novel tire pressure management system.

FIG. 6 is a view in perspective of a push to connect fluid fitting of the rotary union assembly of FIG. 1.

FIG. 7 is a side elevation view of a pair of push to connect fluid fittings of the present novel tire pressure management system of FIG. 1.

DESCRIPTION OF PREFERRED EMBODIMENTS

Figure 4:
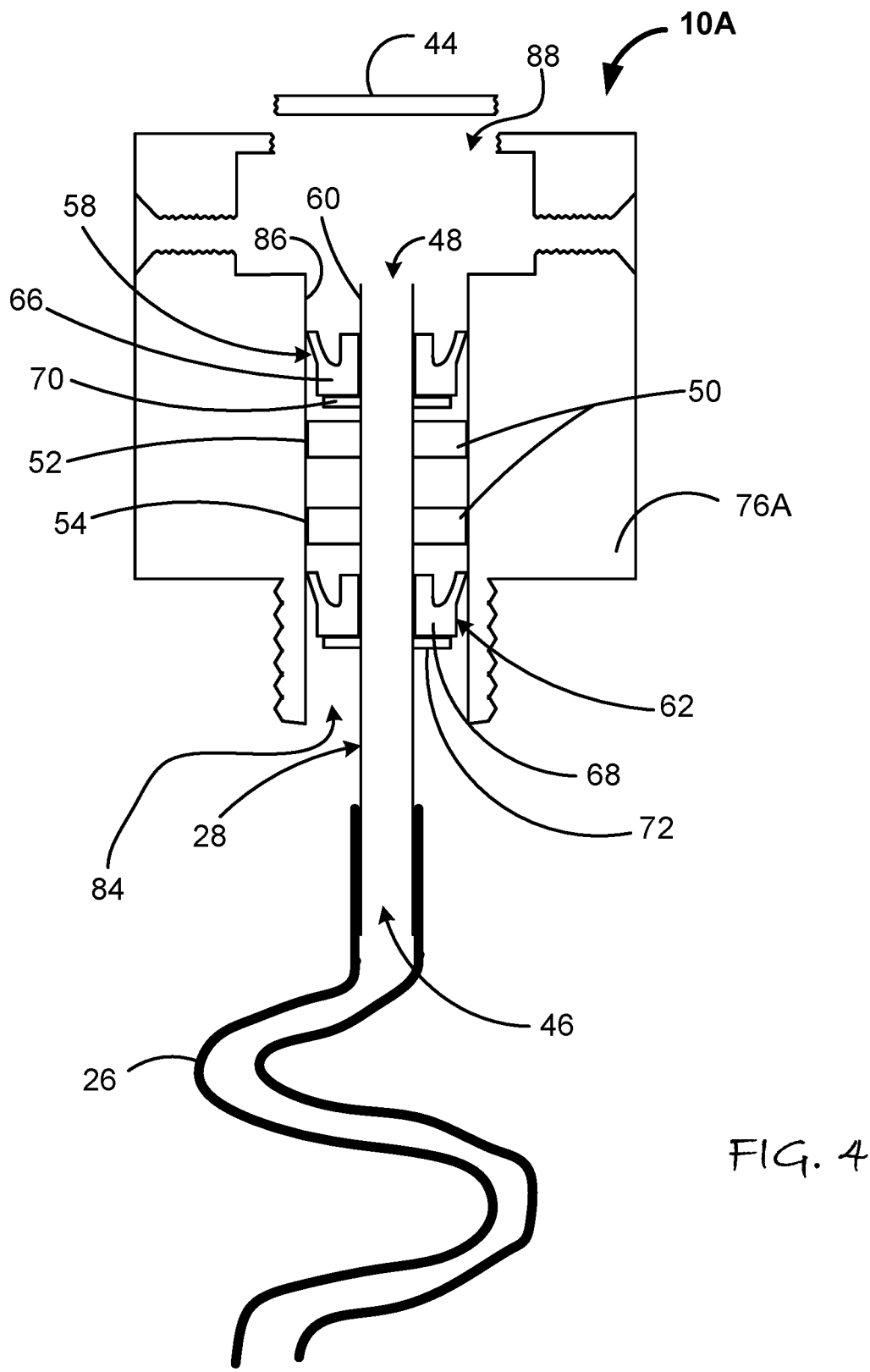
FIG. 4 is a cross-sectional side view of the rotary union housing, air lines and associated seals preferably employed by the present novel tire pressure management system.

It will be readily understood that elements of the present invention, as generally described and illustrated in the Figures herein, could be arranged and designed in a wide variety of different configurations. Referring now in detail to the drawings of the preferred embodiments, the rotary union assembly 10 (also referred to herein as assembly 10, and rotary union 10) of the first preferred embodiment, while useable on a wide variety of movable vehicles employing stationary axles for automatically maintaining the inflation pressure of the pneumatic tires thereon, is particularly adapted for use on tractor trailers. Accordingly, the assembly 10 of the first preferred embodiment will be described in conjunction with a pair of adjacent vehicle tires 12 and 14 mounted on a stationary tractor trailer axle 16 (also referred to herein as trailer axle 16, axle 16, and axle housing 16). While identical rotary union assemblies 10 are provided at the end of each axle on the trailer to maintain the inflation pressure of the tires carried thereby, in each: the preferred embodiment; the alternate preferred embodiment; and the alternative preferred embodiment, reference will be made to only one such assembly and the pair of tires it services.

Preferably, the trailer axle 16 which carries tires 12 and 14 is sealed and functions as a source for pressurized fluid, else houses an air supply line 18 to supply air to the rotary union assembly 10. A fluid supply line 20 preferably provides air under pressure to the interior of the axle 16, else to an air supply line 18, from the conventional air compressor on the tractor via a standard pressure protection valve and control box (not shown) to pressurize the axle 16, else to pressurize the air supply line 18, at the cold tire pressure of the trailer tires. FIG. 1 further shows that the axle 16 supports an axle plug 22, which in turn supports a push to connect fluid fitting 24. Preferably, the push to connect fluid fitting 24 is attached to and in fluid communication with a fill tube 26, which in a preferred embodiment is a flexible fill tube 26. Preferably, the flexible fill tube 26 is connected to a fluid conduit 26, which supplies pressurized air to the rotary union assembly 10. Preferably, the flexible fill tube 26 is secured to the fluid conduit 28 by a compression fitting 30. As those skilled in the art would know, a compression fitting, or alternate mechanical means, could serve the function of the push to connect fluid fitting 24.

In a preferred embodiment, the rotary union assembly 10 is mounted to a hubcap 32 from an exterior 34 of the hubcap 32 and provides pressurized air by way of an air delivery channel 36 to tire pressure hose fittings 38 that are secured to tire pressure hoses 40. Each tire pressure hose 40 supplies the pressurized air to tire valve stems 42 of tires 12 and 14. Preferably, the rotary union assembly 10 provides a removable seal access cover 44, which mitigates escapement of pressurized fluid from the air delivery channel 36, the tire pressure hoses 40, and the tires 12 and 14.

As seen in FIGS. 2 and 3, the fluid conduit 28 provides a downstream end 48 and an upstream end 46 and the rotary union assembly 10 further preferably includes a pair of bearings 50, in which each of the pair of bearings 50 provides an inner race and an outer race. In a preferred embodiment, a first bearing 52 of the pair of bearings 50 is adjacent the downstream end 48 of the fluid conduit 28, while the second bearing 54 of the pair of bearings 50 is adjacent the upstream end 46 of the fluid conduit 28.

FIG. 2 further shows that in a preferred embodiment, the rotary union assembly 10 further includes a pair of fluid seals 56 with a first fluid seal 58, is preferably disposed between the first bearing 52 and the downstream end 48 of the fluid conduit 28, while the second fluid seal 62 of the pair of fluid seals 56 is preferably disposed between the second bearing 54 and the upstream end 46 of the fluid conduit 28. In a preferred embodiment, the second fluid seal 62 mitigates transfer of an environment contained within an interior 64 of the hubcap 32 from entry into the pair of bearings 50.

FIG. 2 further shows that in a preferred embodiment, each of the pair of fluid seals 56 (58 and 62) provide a base portion (66 and 68 respectfully) and the rotary union assembly 10 further includes: a first fluid seal restraint 70, which is disposed between the first bearing 52 and the base portion 66 of the first fluid seal 58 and in pressing engagement with the external surface 60 of the fluid conduit 28; and a second fluid seal restraint 72, which is disposed between the base portion 68 of the second fluid seal 62 and in pressing engagement with the external surface 60 of the fluid conduit 28. FIG. 2 still further shows that the rotary union 10 preferably includes a bearing spacer 74 disposed between the first bearing 52 and the second bearing 54 of the pair of bearings 50. The bearing spacer 74 provides stability of the first and second bearings (52, 54) during the process of pressing the pair of bearings 50 into a rotary union housing 76 of the rotary union assembly 10.

As discussed hereinabove, in a preferred embodiment, the second fluid seal 62 mitigates transfer of an environment contained within an interior 64 of the hubcap 32 from entry into the pair of bearings 50. However, if the environment within the hubcap 32 elevates in pressure, a spring loaded pressure relief valve 78 (such as a poppet valve), else a pressure relief seal 80 (of FIG. 9) also referred to herein as a pressure equalization structure 80A (of FIG. 11), confined by an excess pressure collection chamber 82 (which is provided by the rotary union housing 76 and is in contact adjacency with the exterior 34 of the hubcap 32 and shown by FIGS. 2 and 3) activates to relieve the pressure present in the pressure collection chamber 82 to atmosphere. That is, when the pressure contained by the pressure collection chamber 82 reaches a predetermined pressure level, which in a preferred embodiment is in the range of 5 to 8 PSI.

FIG. 4 shows a preferred embodiment that preferably includes at least the rotary union housing 76A supporting and confining the fluid conduit 28 within a central bore 84 (also referred to herein as channel 84) of the rotary union housing 76A. The fluid conduit 28 preferably provides the downstream end 48 and the upstream end 46. Further shown by FIG. 4 is the pair of bearings 50; each of the pair of bearings 50 provides an inner race and an outer race. Each inner race of the pair of bearings 50 is in pressing communication with the external surface 60 of the fluid conduit 28 and each outer race of the pair of bearings 50 is in pressing communication with a bore surface 86 (also referred to herein as wall 86) of the central bore 84 of the rotary union housing 76A. The first bearing 52 of the pair of bearings 50 is adjacent the downstream end 48 of the fluid conduit 28 and the second bearing 54 of the pair of bearings 50 is adjacent the upstream end 46 of the fluid conduit 28.

FIG. 4 further shows that in a preferred embodiment, the rotary union 10A preferably includes a pair of fluid seals 56, the first fluid seal 58 of the pair of fluid seals 56 engages the external surface 60 of the fluid conduit 28 and is disposed between the first bearing 52 and the downstream end 48 of said fluid conduit 28. The second fluid seal 62 of the pair of fluid seals 56 engages the external surface 60 of the fluid conduit 28 and is disposed between said second bearing 54 and the upstream end 46 of the fluid conduit 28. In a preferred embodiment, the first fluid seal 58 provides the base portion 66 and the first fluid seal restraint 70, which is in pressing contact with the external surface 60 of the fluid conduit 28, abuts against the base portion 66 of the first fluid seal 58 to maintain the relative position of the first fluid seal 58 adjacent the bore surface 86 of the central bore 84; and the second fluid seal 62 provides the base portion 68 and the second fluid seal restraint 72, which is in pressing contact with the external surface 60 of the fluid conduit 28, abuts against the base portion 68 of the second fluid seal 62 to maintain the relative position of the second fluid seal 62 adjacent the bore surface 86 of the central bore 84. In a preferred embodiment, the rotary union housing 76A further provides a fluid distribution chamber 88 (also referred to herein as a fluid chamber 88), which is in fluid communication with the downstream end 48 of the fluid conduit 28. The fluid chamber 88 receives pressurized air from the fluid conduit 28 and transfers the received pressurized air to the tires 12 and 14 (of FIG. 1).

Figure 5:
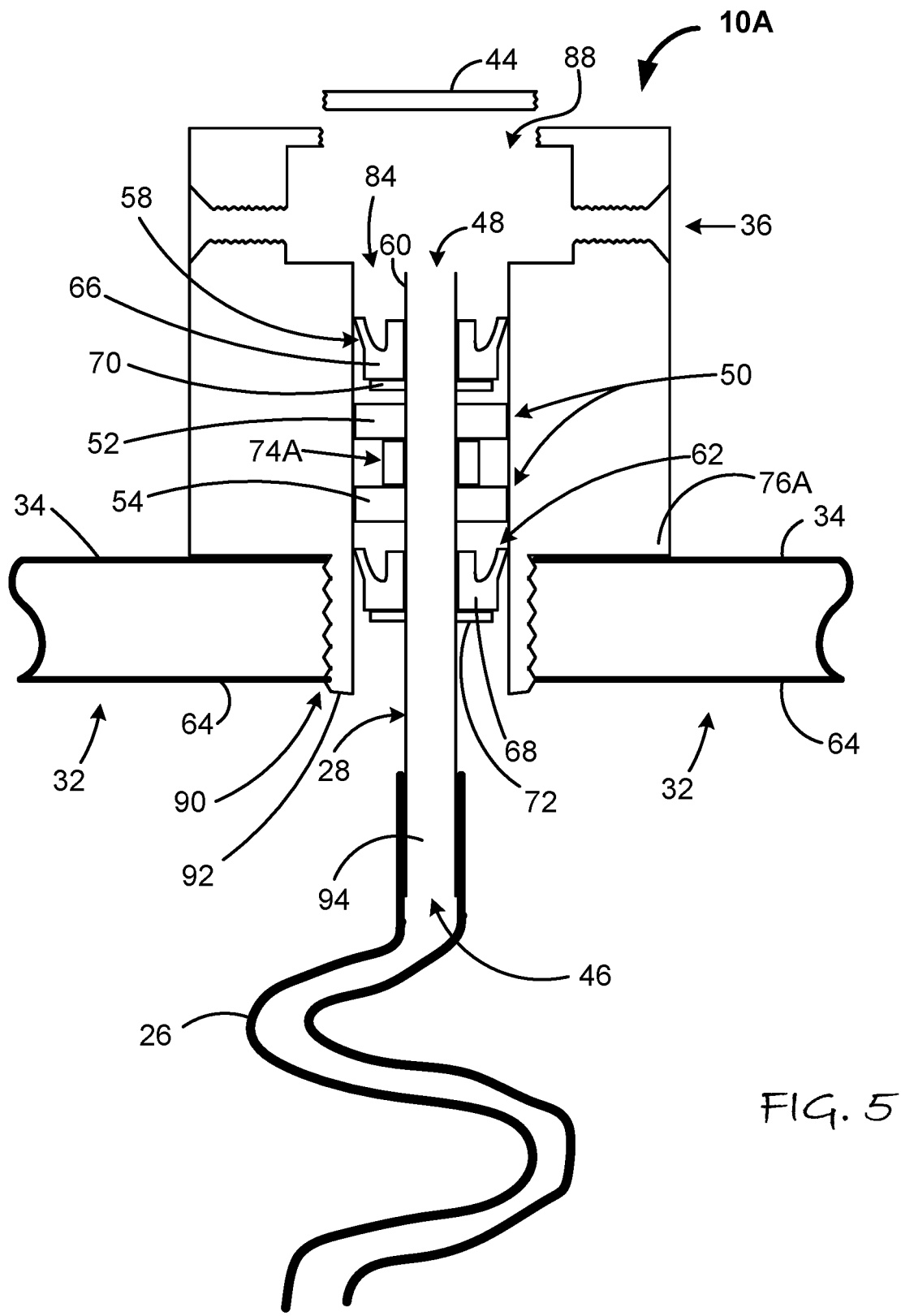
FIG. 5 is a cross-sectional side view of an alternate rotary union assembly of the present novel tire pressure management system and its associated bearings and bearing spacer.

FIG. 5 shows that in a preferred embodiment, the hubcap 32 provides an attachment aperture 90. The attachment aperture 90 is preferably disposed between the interior 64 and the exterior 34 of the hubcap 32. The attachment aperture 90 provides an axis of rotation, which is preferably substantially aligned with an axis of the axle 16 (of FIG. 1). Additionally, the rotary union housing 76A provides at least an attachment member 92, which preferably is in mating communication with the attachment aperture 90. FIG. 5 further shows that the fluid conduit 28 provides a fluid communication portion 94, which extends beyond the attachment member 92 and into the interior of said hubcap 32.

FIGS. 6 and 7 show the push to connect fluid fitting 24 of a preferred embodiment. The push to connect fitting, model No. 1868X4 by Eaton Weatherhead, of Maumee, Ohio is an example of a push to connect fitting of the type found useful in a preferred embodiment. FIG. 7 shows that in a preferred embodiment, two push to connect fluid fittings 24 are secured to the axle plug 22. In a preferred embodiment, one of the pair of push to connect fluid fittings 24 is in fluid communication with the air supply line 18 while the other is in fluid communication with the fill tube 26. FIG. 7 shows that in a preferred alternate embodiment, the axle plug 22 provides a pressure transfer conduit 96 which is used to disburse pressurized air, which may accumulate in the interior 64 of the hubcap 32 (both of FIG. 4) back into the axle housing 16 when the air supply line 18 is utilized to convey pressurized air to the rotary union 10 (of FIG. 2).

Figure 8:
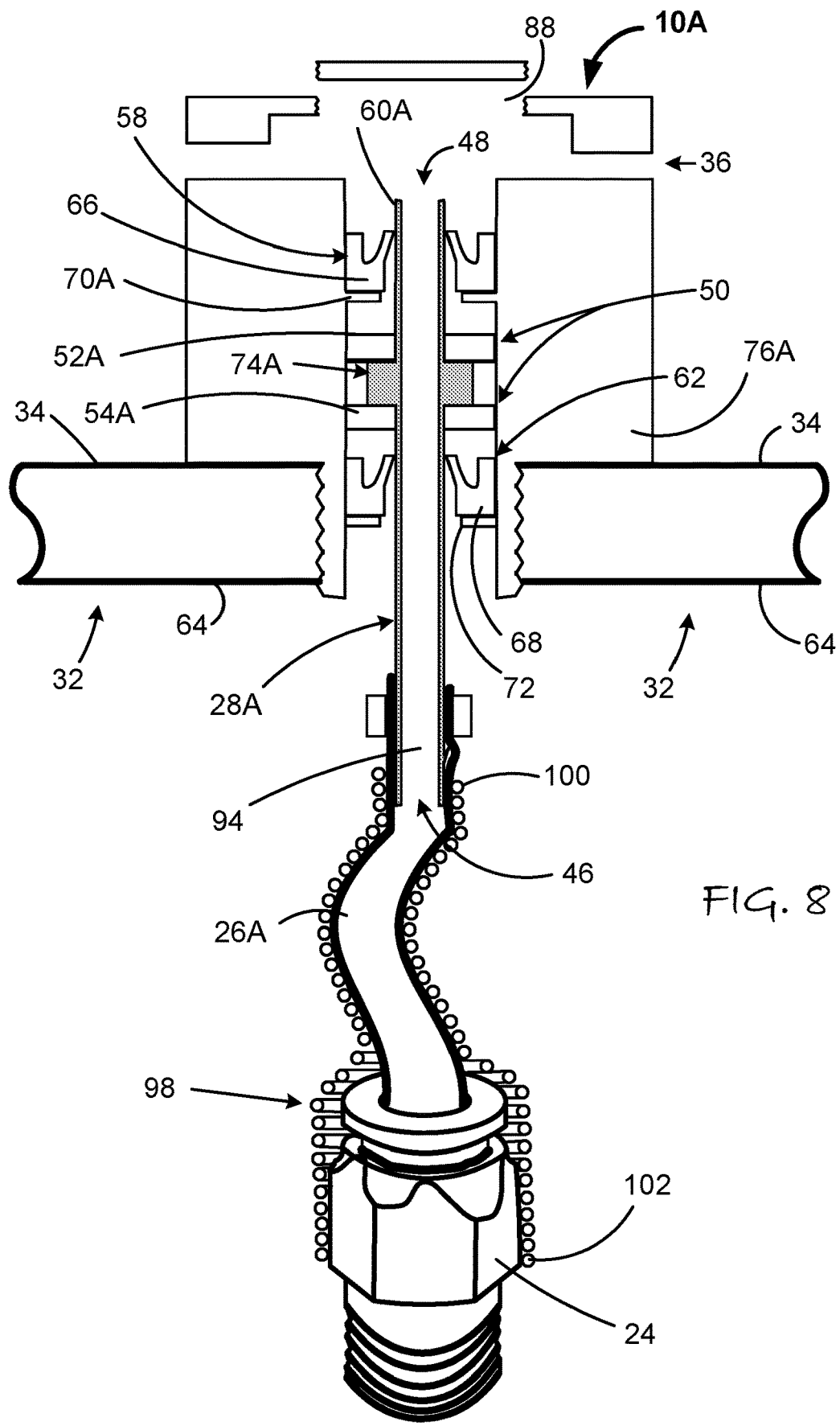
FIG. 8 is a cross-section view of the rotary union housing of an alternative rotary union assembly of the present novel tire pressure management system showing an anti-rotational means.

FIG. 8 depicts an alternate preferred embodiment of the present invention, in which the fluid conduit 28A provides the bearing spacer 74A and the rotary union housing 76A provides the first fluid seal restraint 70. Additionally, in a preferred embodiment, the fill tube 26A is a flexible fill tube formed from a polymer, such as a polyurethane based material, else a metallic material, such as a shape memory alloy. FIG. 8 further shows that when the flexible fill tube 26A is connected to the push to connect fluid fitting 24, an anti-rotational means 98 is incorporated into the rotary union 10A. Preferably, the anti-rotational means 98 has a first end 100 and a second end 102. The first end 100 of the anti-rotational means 98 is secured to the flexible fill tube 26A adjacent the fluid communication portion 94. The second end 102 of the anti-rotational means 98 connects to the push to connect fluid fitting 24. Preferably, the anti-rotational means 98 mitigates rotation of the fill tube 26A when the rotary union housing 76A, in conjunction with the hubcap 32, rotates about the fluid conduit 28A. By example, but not by limitation, a coiled spring has been found useful as the anti-rotational means 98; in an alternate example, but not by way of limitation, a torsion bar 104 (of FIG. 9) has been found useful to serve as an anti-rotational means 98. However, as those skilled in the art will appreciate, any of a host of mechanical structures which serve to mitigate rotation of the fill tube 26A when the rotary union housing 76A, in conjunction with the hubcap 32, rotates about the fluid conduit 28A may be employed to serve this purpose.

Figure 9:
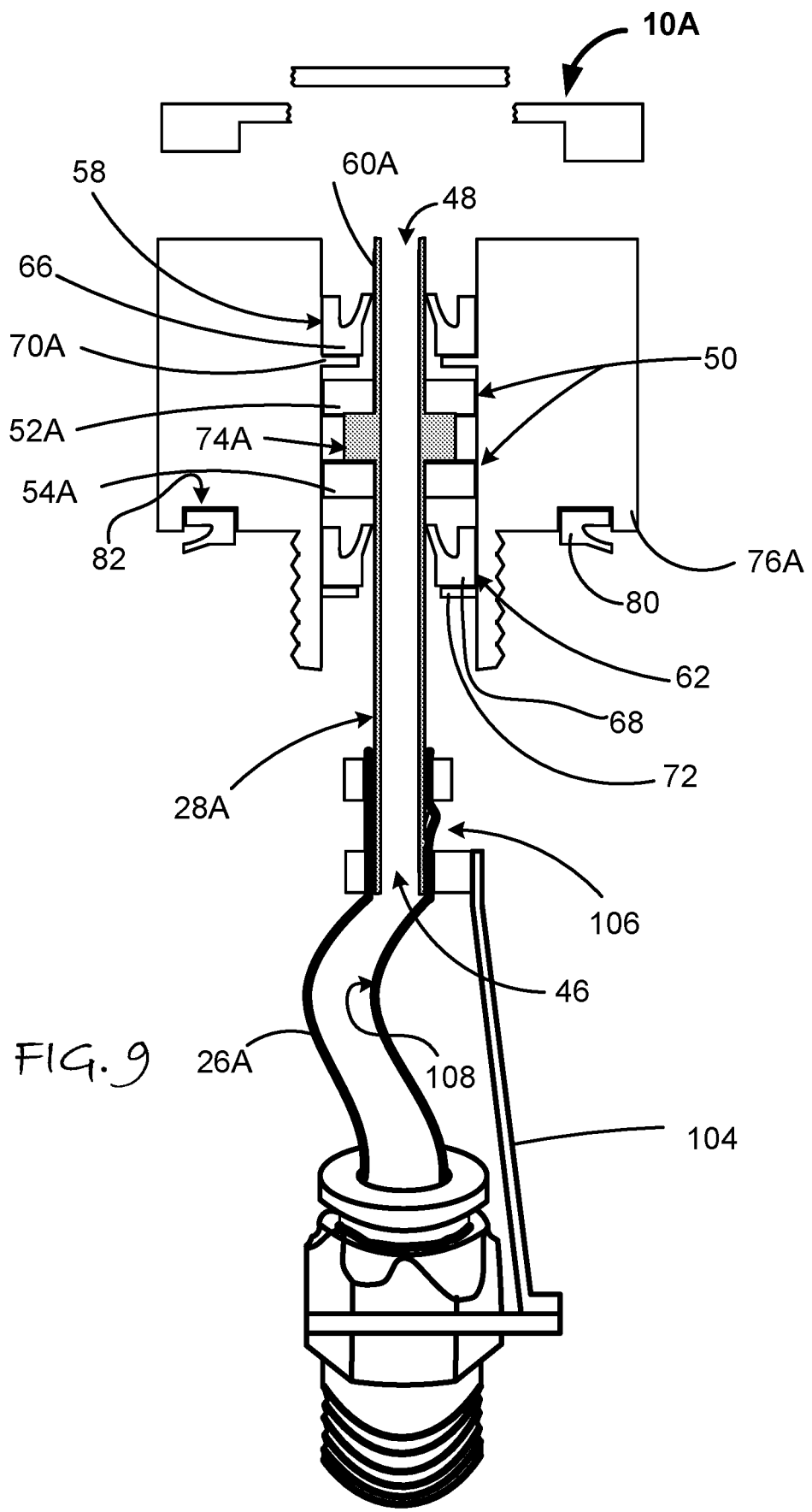
FIG. 9 is a cross-section view of the rotary union housing of the alternative rotary union assembly of FIG. 8, of the present novel tire pressure management system showing an alternate anti-rotational means.

In an alternate preferred embodiment, in addition to the fluid chamber 88, the rotary union housing 76A further provides the air delivery channel 36 which is in fluid communication with, and extending radially from, said fluid chamber 88 as shown by FIG. 8. The fluid conduit 28A further provides a retention barb 106 protruding from the fluid conduit 28A and communicating with an interior surface 108 of said flexible fill tube 26A. The retention barb 106 mitigates an inadvertent removal of said flexible fill tube 26A from the fluid conduit 28A. The retention barb 106 is preferably positioned adjacent to, and downstream from the compression fitting 30, as shown by FIG. 9.

Figure 10:
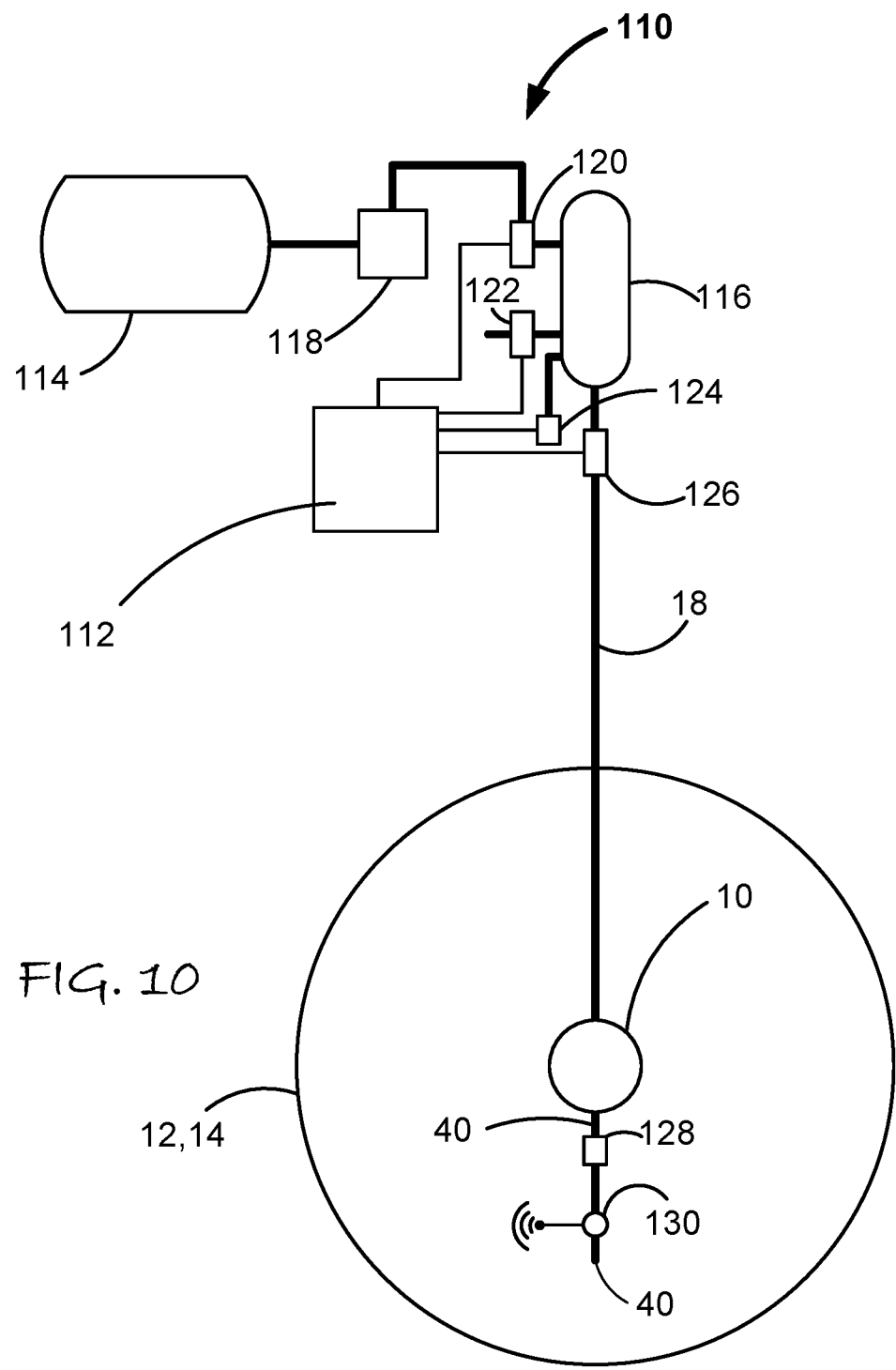
FIG. 10 is a block diagram of the present novel tire pressure management system of FIG. 1.

FIG. 10 shows a tire pressure management system 110, which preferably includes at least a fluid pressure controller 112, which in a preferred embodiment controls the flow of pressurized air into and out of the tires 12 and 14. The source of the pressurized air is a trailer air tank 114. The trailer air tank 114 is in fluidic communication with a tire pressure tank 116. The pressurized air from the trailer air tank 114 passes through an air regulator 118 and then through an air inlet control valve 120 operating under the control of the fluid pressure controller 112. In a preferred embodiment, the tire pressure management system 110 further includes at least: an air outlet valve 122 in fluid communication with the tire pressure tank 116 and under the control of the fluid pressure controller 112; a tire pressure tank pressure gauge 124 in fluid communication with the tire pressure tank 116 and in electronic communication with the fluid pressure controller 112; and an air pressure supply valve 126 in fluid communication with the tire pressure tank 116 and under the control of the fluid pressure controller 112. Preferably, the air pressure supply valve 126 supplies pressurized air to, or conversely, receives pressurized air from the air supply line 18, depending on whether the pressure in the tire (12,14) is above or below a desired pressure level.

In a preferred embodiment, pressurized air that flows into or out of the rotary union 10A is modulated by a dual flow control valve 128. Preferably, the dual flow control valve 128 responds to air pressure supplied by the air supply line 18 by opening a spring loaded valve member, which allows pressurized air to flow out of the tire (12,14) when the pressure in the tire (12,14) is greater than the air pressure in the air supply line 18. Conversely, the dual flow control valve 128 promotes the flow of pressurized air into the tire (12, 14) when the pressure level within the tire 12, 14 is less than the air pressure in the air supply line 18.

FIG. 10 further shows that the tire pressure management system 110 further preferably includes a tire pressure monitoring sensor 130 disposed between the dual flow control valve 128 and the tire (12,14) and in electronic communication with the fluid pressure controller 112. In a preferred embodiment, the tire pressure monitoring sensor 130 measures the level of pressure within the tire (12, 14) and relays the measured pressure level to the fluid pressure controller 112. The fluid pressure controller 112 compares the measured pressure level within the tire (12,14) to a target pressure, maintains the pressure available in the tire pressure tank 116 at the target level, and directs the air pressure supply valve 126 to release pressurized air to the dual flow control valve 128, which activates to promote either inflation, or deflation of the tire (12,14) to bring the pressure level within the tire (12,14) into balance with the target pressure level. Once the desired pressure level within the tire (12, 14) is achieved, as measured by the tire pressure monitoring sensor, the fluid pressure controller 112 directs the air pressure supply valve 126 to disengage.

In a preferred embodiment, the fluid pressure controller 112 operates both the air outlet valve 122 and the air inlet control valve 120 to maintain the pressure within the tire pressure tank 116 at a predetermined pressure level. For example, but not by way of limitation, if the tire pressure of the tires (12, 14) is above the target pressure level, the fluid pressure controller 112 will crack open the air outlet valve 122 to allow relief of pressure from the system; and if the tire pressure of the tires (12, 14) is below the target pressure level, the fluid pressure controller 112 will crack open the air inlet control valve 120 to allow pressure to build in the system.

Figure 11:
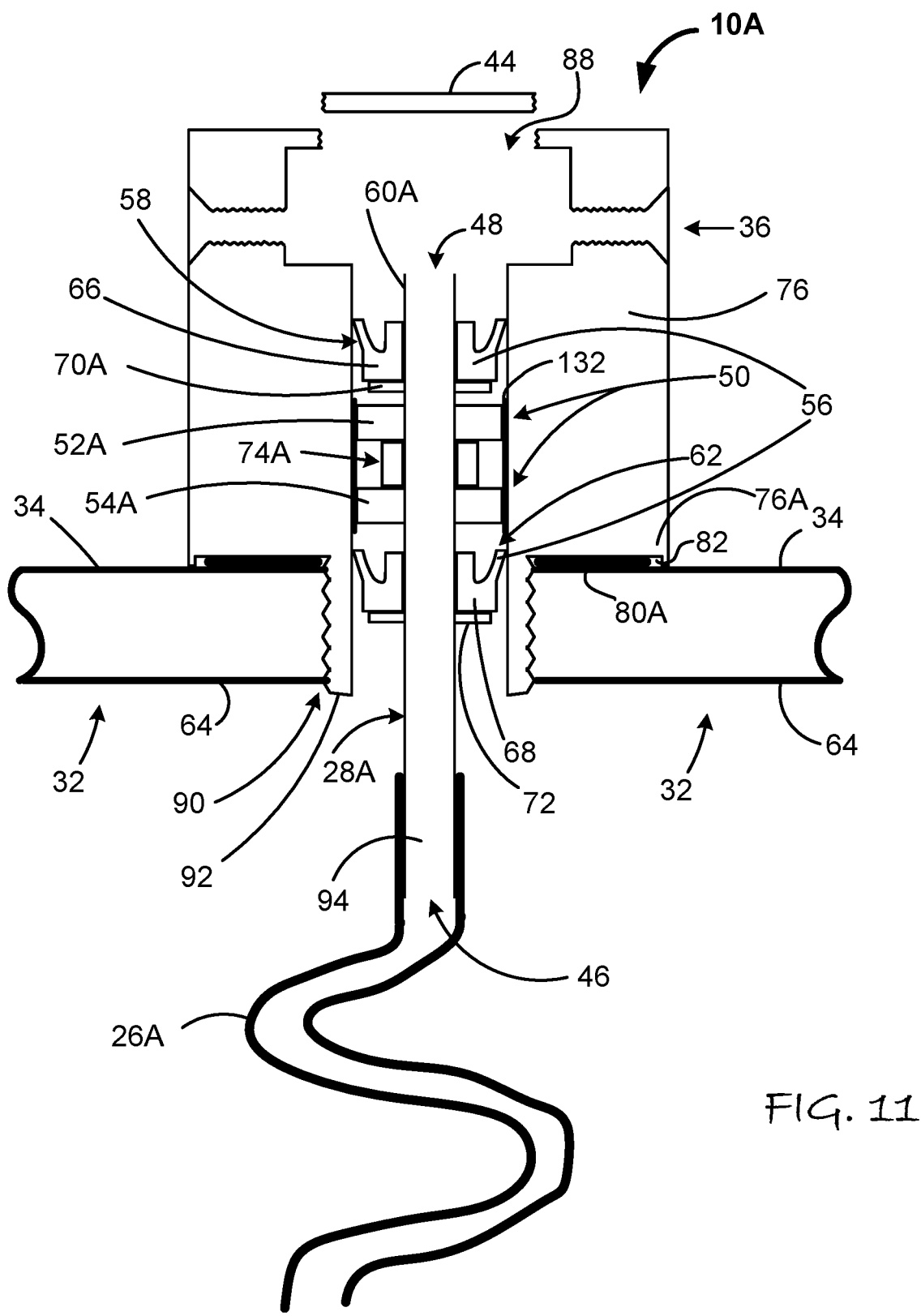
FIG. 11 is a cross-sectional side view of the rotary union housing, air lines, bearing sleeve, and associated seals preferably employed by the present novel tire pressure management system.

FIG. 11 shows a preferred embodiment that preferably includes at least the rotary union housing 76A supporting and confining the fluid conduit 28A within a central bore 84 (also referred to herein as channel 84 of FIG. 4) of the rotary union housing 76A. The fluid conduit 28A preferably provides the downstream end 48 and the upstream end 46. Further shown by FIG. 4 is the pair of bearings 50; each of the pair of bearings 50 provides an inner race and an outer race. Each inner race of the pair of bearings 50 is in pressing communication with the external surface 60A of the fluid conduit 28A and each outer race of the pair of bearings 50 is in pressing communication with a bore surface 86 (also referred to herein as wall 86) of the central bore 84 of the rotary union housing 76A. The first bearing 52 of the pair of bearings 50 is adjacent the downstream end 48 of the fluid conduit 28A and the second bearing 54 of the pair of bearings 50 is adjacent the upstream end 46 of the fluid conduit 28A.

FIG. 11 further shows that in a preferred embodiment, the rotary union 10A preferably includes a pair of fluid seals 56, the first fluid seal 58 of the pair of fluid seals 56 engages the external surface 60A of the fluid conduit 28A and is disposed between the first bearing 52 and the downstream end 48 of said fluid conduit 28A. The second fluid seal 62 of the pair of fluid seals 56 engages the external surface 60A of the fluid conduit 28A and is disposed between said second bearing 54 and the upstream end 46 of the fluid conduit 28A. In a preferred embodiment, the first fluid seal 58 provides the base portion 66 and the first fluid seal restraint 70, which is in pressing contact with the external surface 60A of the fluid conduit 28A, abuts against the base portion 66 of the first fluid seal 58 to maintain the relative position of the first fluid seal 58 adjacent the bore surface 86 of the central bore 84; and the second fluid seal 62 provides the base portion 68, and the second fluid seal restraint 72, which is in pressing contact with the external surface 60A of the fluid conduit 28A, abuts against the base portion 68 of the second fluid seal 62 to maintain the relative position of the second fluid seal 62 adjacent the bore surface 86 of the central bore 84.

In a preferred embodiment, the rotary union housing 76A further provides a fluid distribution chamber 88 (also referred to herein as a fluid chamber 88), which is in fluid communication with the downstream end 48 of the fluid conduit 28A. The fluid chamber 88 receives pressurized air from the fluid conduit 28A and transfers the received pressurized air to the tires 12 and 14 (of FIG. 1). Additionally, the rotary union housing 76A provides at least the attachment member 92, which preferably is in mating communication with the attachment aperture 90 of the hubcap 32 and further shows that the fluid conduit 28A provides a fluid communication portion 94, which extends beyond the attachment member 92 and into the interior of said hubcap 32.

In a preferred embodiment, the rotary union 10A preferably includes a bearing sleeve 132, and the bearing sleeve 132 is preferably in pressing contact with the central bore 84, or may be joined to the central bore 84 of the rotary union housing 76A by means of the use of an adhesive, weld, solder, or other mechanical joint techniques, such as through an insert molding process.

Preferably, the pair of bearings 50 each provide an inner race and an outer race, each inner race of the pair of bearings 50 is preferably in direct contact adjacency with the external surface 60A of the fluid conduit 28A, while the outer race of each of the pair of bearings 50 are preferably in pressing communication with the internal surface of the bearing sleeve 132. The bearing sleeve 132 may be formed from a composite material; a metallic material (such as, but not limited to brass, aluminum, stainless steel, iron or steel); or from a polymeric materials (such as, but not limited to nylon, Delran™, phenolic, or Teflon™).

As further shown by FIG. 11, an excess pressure collection chamber 82 is provided by the rotary union housing. The excess pressure collection chamber 82 is preferably adjacent the exterior 34 of the hubcap 32 and serves to accommodate a pressure equalization structure 80A. The pressure equalization structure 80A is preferably disposed within the excess pressure collection chamber 82 and in contact adjacency with the exterior 34 of the hubcap 32. As is shown in FIGS. 9 and 11, the mechanical configuration of the cooperation between the pressure equalization structure 80A and the excess pressure collection chamber 82 may take on a plurality of forms.

Figure 12:
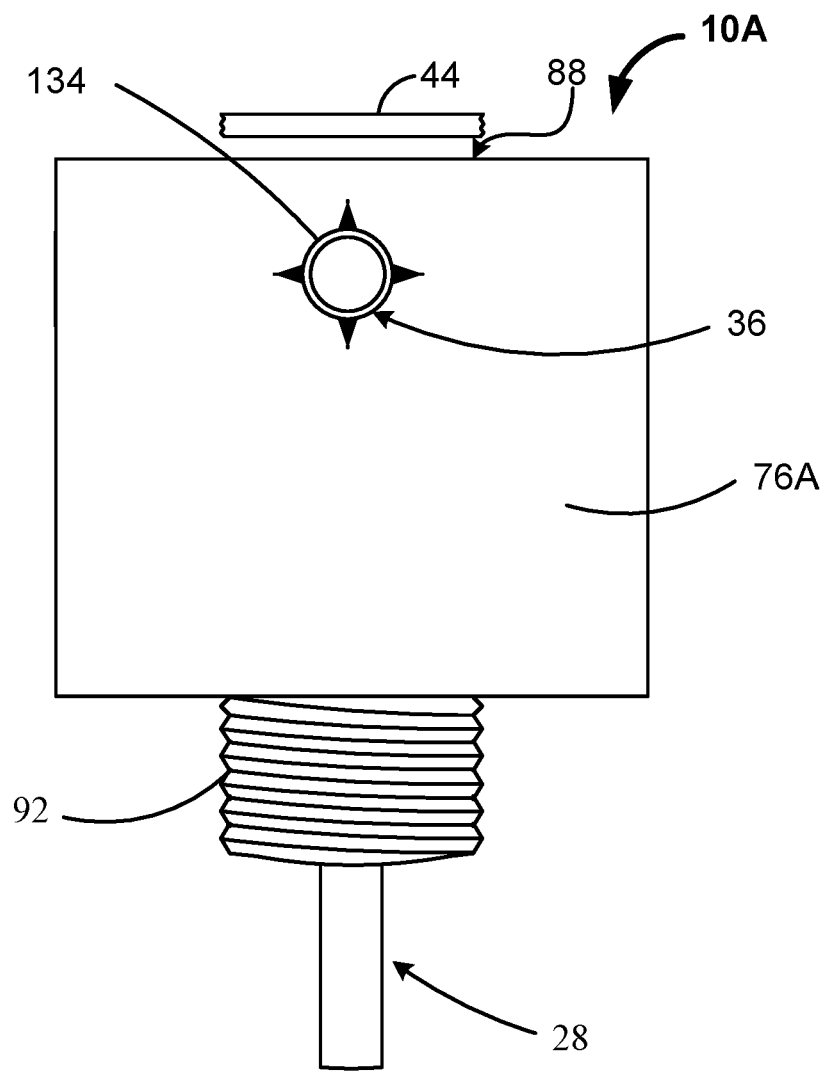
FIG. 12 is a side view in elevation of a rotary union housing formed from a polymer, and providing a threaded insert molded into the polymer rotary housing.

FIG. 12 shows a side view in elevation of a rotary union housing 76A formed from a polymeric materials (such as, but not limited to nylon, Delran™, phenolic, or Teflon™), and providing a threaded insert 134, the threaded insert 134 molded into the polymer rotary housing 76A confined within the air delivery channel 36 and in fluidic communication with the fluid chamber 88.

Figure 13:
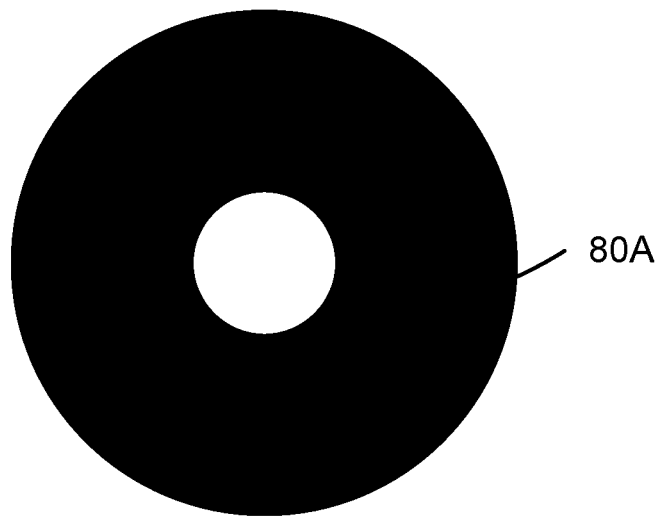
FIG. 13 is a top plan view of a pressure equalization structure of FIG. 11.

FIG. 13 shows a top plan view of the pressure equalization structure 80A of FIG. 11. In a preferred embodiment, the pressure equalization structure 80A is a filter material (of metal, fiber, or polymer, such as, but not limited to spun bonded polypropylene) as a top layer, and a bottom layer is preferably formed from flashspun high-density polyethylene fibers that promotes the transfer of air, while mitigating the transfer of dirt and water.

Figure 14:
FIG. 14 is a side view in elevation of an embodiment of the pressure equalization structure of FIG. 13.
Figure 15:
FIG. 15 is a side view in elevation of an alternate embodiment of the pressure equalization structure of FIG. 13.
Figure 16:
FIG. 16 is a side view in elevation of an alternative embodiment of the pressure equalization structure of FIG. 13.

FIG. 14 shows a side view in elevation of a preferred component of the bottom layer 136 of the pressure equalization structure 80A of FIG. 13. While FIG. 15 shows a side view in elevation of a preferred component of the top layer 138 of the pressure equalization structure 80A of FIG. 13. And FIG. 16 shows a side view in elevation of a combination 140 of the preferred bottom layer 136 applied to an external surface of the top layer 138.

Figure 17:
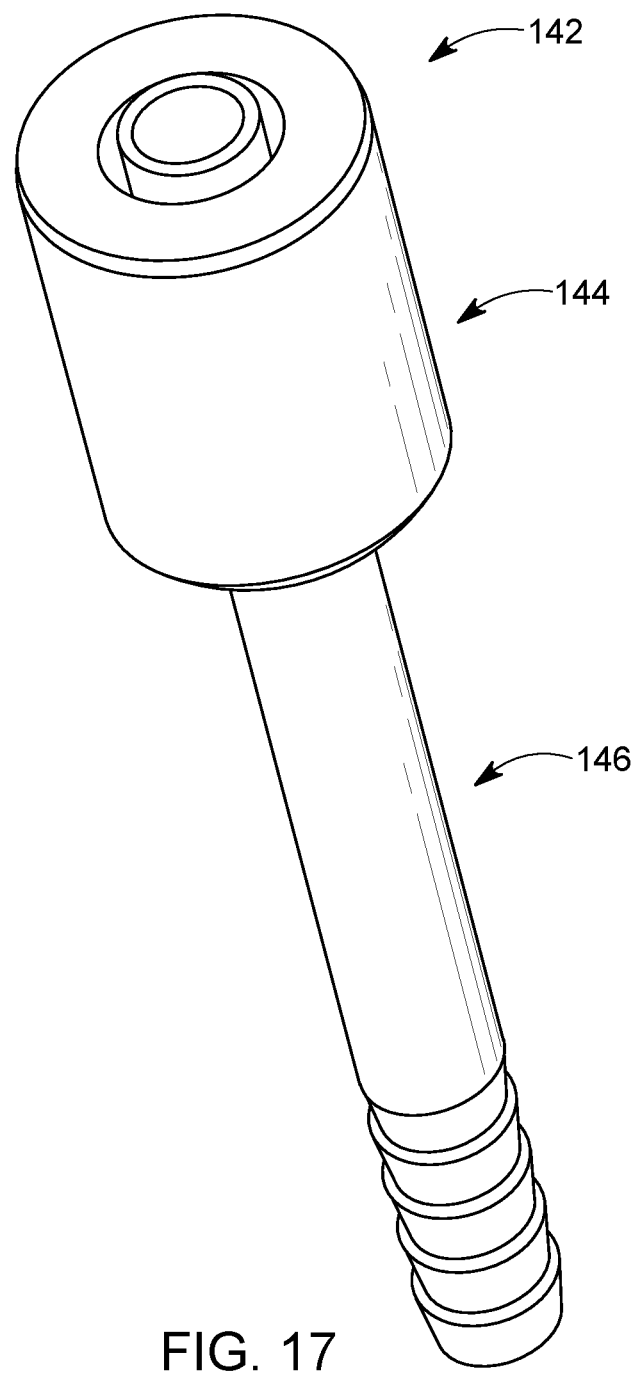
FIG. 17 is a perspective view of an alternate cartridge bearing secured to a fluid conduit.
Figure 18:
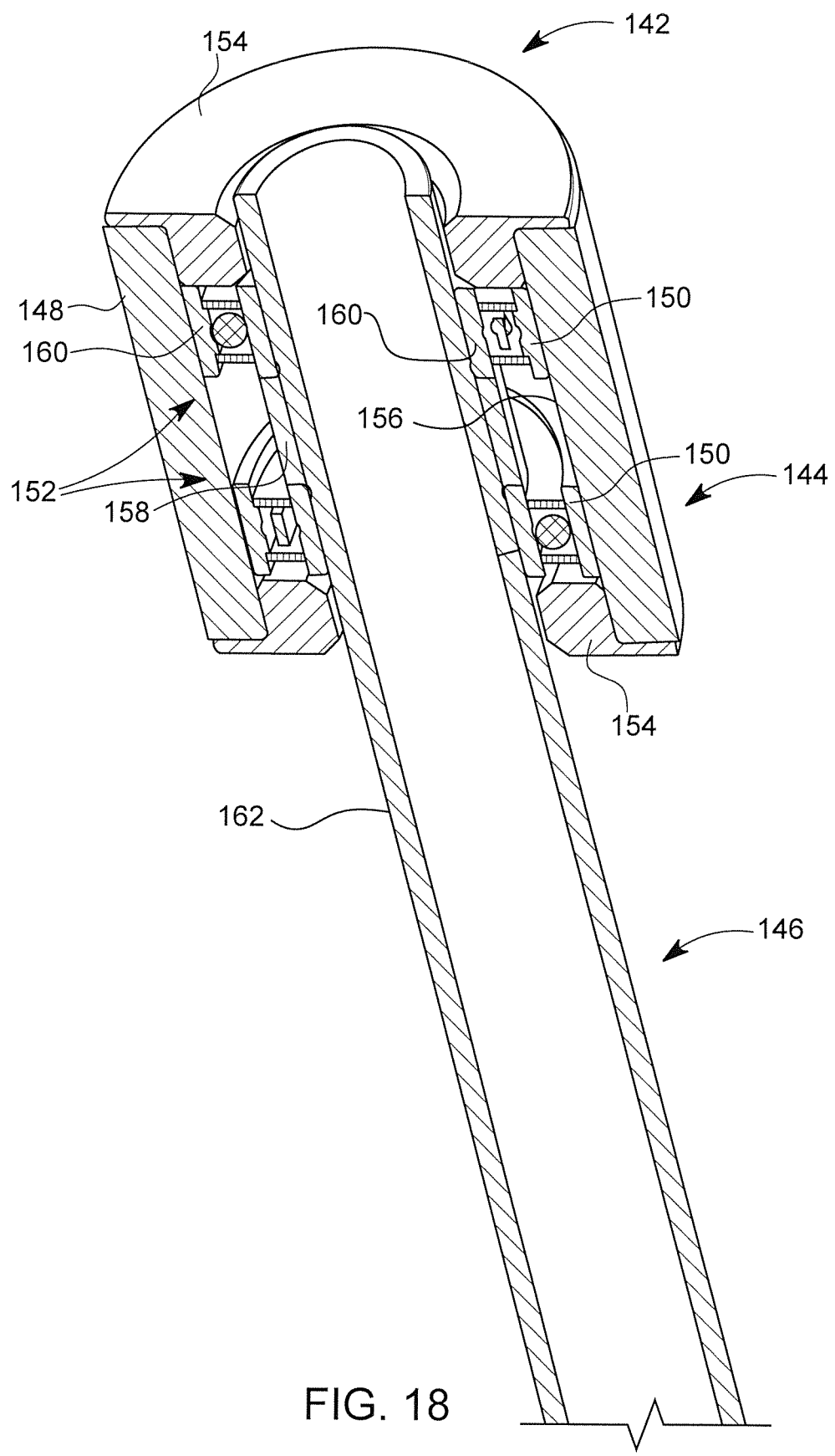
FIG. 18 is a partial cut away, perspective view of the alternate cartridge bearing secured to the fluid conduit of FIG. 17.

FIG. 17 shows an alternate cartridge bearing assembly 142 having a cartridge bearing 144 secured to a fluid conduit 146, while FIG. 18 shows a partial cut away, perspective view of the alternate cartridge bearing assembly 142 having the cartridge bearing 144 secured to the fluid conduit 146 of FIG. 17. The cartridge bearing 144 preferably includes a bearing sleeve 148 in sliding communication with an outer race 150 of a bearing 152. The cartridge bearing 144 further preferably includes a bearing constraint 154, which is preferably in pressing contact with an internal surface 156 of the bearing sleeve 148. Preferably, the bearing constraint 154 is in contact adjacency with the outer race 150 of the bearing 152.

To assure registration of the cartridge bearing 144 to the fluid conduit 146, the fluid conduit 146 provides a bearing support feature 158. Preferably, an inner race 160 of the bearing 152 is in sliding communication with an outer surface 162 of the fluid conduit 146 and in contact adjacency with the bearing support feature 158.

Figure 19:
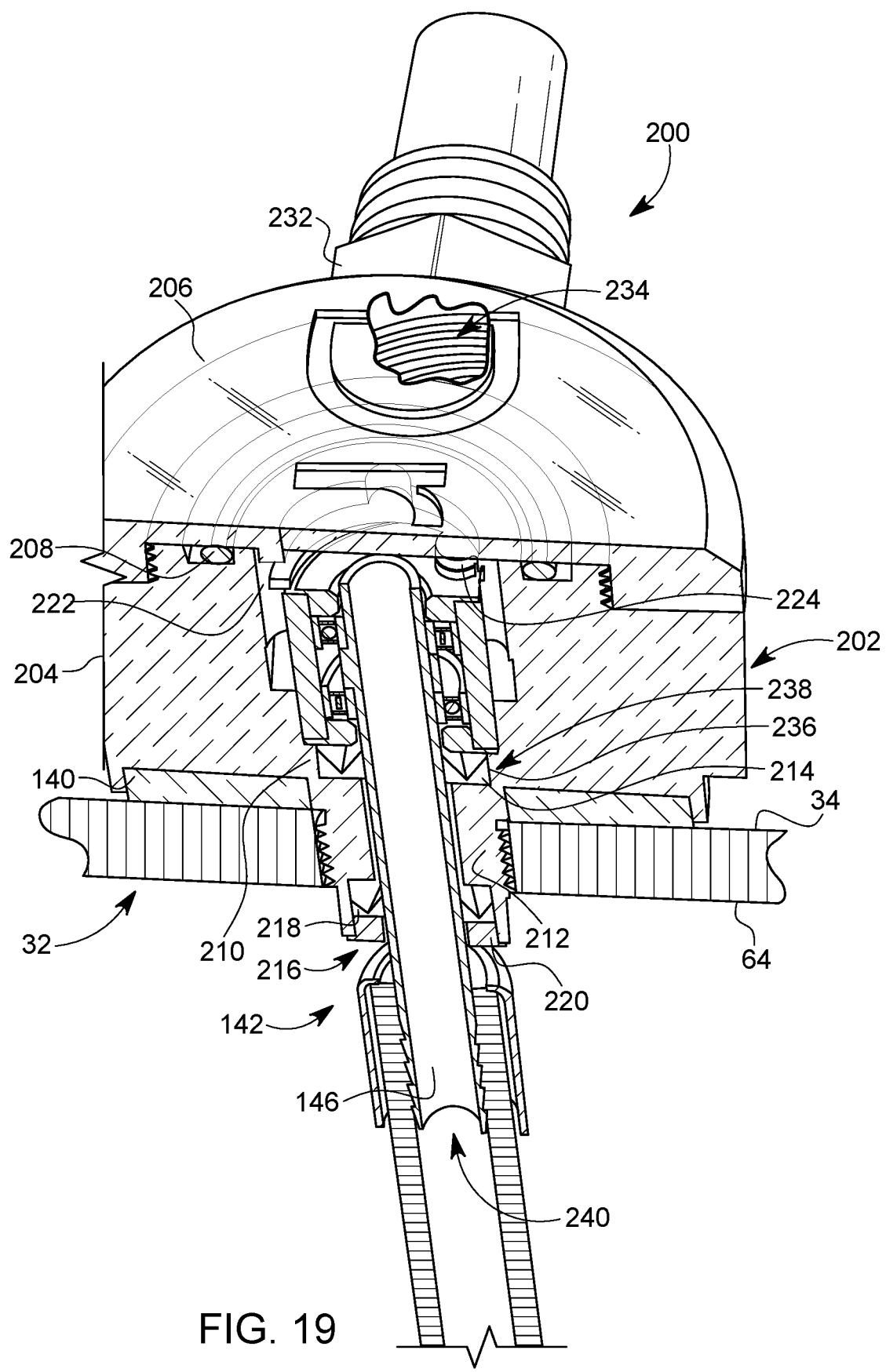
FIG. 19 is a partial cut away, perspective view of an alternate rotary union assembly.

FIG. 19 shows an alternate rotary union assembly 200 ("RU 200"), includes at least the alternate cartridge bearing assembly 142 secured to a rotary union housing 202, which in turn is attached to the hubcap 32 from the exterior of the hubcap 34. Preferably, the rotary union housing 202 includes: a main body 204 which communicates directly with the hubcap 32; a cover portion 206 secured to the main body 204; and a seal 208 disposed between the main body 204 and the cover portion 206.

In a preferred embodiment, the main body 204 provides: a cartridge bearing support feature 210, which is in supporting contact adjacency with the bearing sleeve 148; a primary seal support feature 212 (also referred to herein as a first seal restraint 212) supporting a primary seal 214; a secondary seal aperture 216 (also referred to herein as an auxiliary bore 216), which accommodates a secondary seal 218 secured in position by a press plug 220 (also referred to herein as a second seal restraint 220); and a bearing cartridge retention land 222 accommodating a retention structure 224. The retention structure 224 is in direct contact adjacency with the bearing sleeve 148 and serves to secure the alternate cartridge bearing assembly 142 within the main body 204 of the RU 200. Additionally, FIG. 19 further shows a threaded insert 234 (which is functionally equivalent, in form and function, to threaded insert 134 of FIG. 12) and into which a valve stem 232 is threaded. Preferably, primary seal 214 (also referred to herein as the first seal 214) in conjunction with the secondary seal 218 (also referred to herein as the first seal 218) form a pair of fluid seals. The first seal 214 of the pair of fluid seals engages the external surface 162 (of FIG. 18) of the fluid conduit 146 (of FIG. 18) and a bore 236 surface of a central bore 238. The first seal 214 disposed between said bearing sleeve 148 and the upstream end 240 of the fluid conduit 146. The second seal 218 is offset from the first seal 214, and engages the external surface 163 of the fluid conduit 146 and said auxiliary bore 216 of the rotary union housing 202. The second seal 218 is adjacent the interior 64 of said hubcap 32, wherein each the first seal 214 and second seal 218 of said pair of fluid seals forms a rotary seal between the external surface 162 of the fluid conduit 146 and the bore surface 236 of said central bore 238.

As will be apparent to those skilled in the art, a number of modifications could be made to the preferred embodiments which would not depart from the spirit or the scope of the present invention. While the presently preferred embodiments have been described for purposes of this disclosure, numerous changes and modifications will be apparent to those skilled in the art. Insofar as these changes and modifications are within the purview of the appended claims, they are to be considered as part of the present invention.

What is claimed is:

1. A tire pressure management system comprising:
   an axle housing enclosing a pressurized fluid;
   a hubcap supported by the axle and having an interior and an exterior; and
   a rotary union axially aligned with the axle housing and mounted to the hubcap from the exterior of the hubcap, the rotary union including at least:
   a rotary union housing providing at least a fluid distribution chamber and a central bore and an auxiliary bore, the central bore providing an internal surface and a portion of said fluid distribution chamber, while the auxiliary bore provides an aperture for a fluid conduit;
   a bearing sleeve in pressing contact with the central bore;
   the fluid conduit having an internal surface, an external surface, a downstream end and an upstream end, the fluid conduit supported by the bearing sleeve;
   a pair of bearings, each of the pair of bearings providing an inner race and an outer race, each inner race of the pair of bearings in sliding contact adjacency with the external surface of the fluid conduit, each outer race of the pair of bearings in sliding communication with the internal surface of the bearing sleeve, a first bearing of the pair of bearings adjacent the downstream end of said fluid conduit, and a second bearing of the pair of bearings adjacent the upstream end of said fluid conduit; and
   a pair of fluid seals, a first seal of said pair of fluid seals engaging said external surface of the fluid conduit and said bore surface of said central bore, said first seal disposed between said bearing sleeve and said upstream end of said fluid conduit, and a second seal of said pair of fluid seals, said second seal offset from said first seal, engaging said external surface of the fluid conduit and said auxiliary bore of said rotary union housing, said second seal adjacent said interior of said hubcap, wherein each first seal and second seal of said pair of fluid seals forms a rotary seal between said external surface of the fluid conduit and said bore surface of said central bore.

2. The tire pressure management system of claim 1, in which said fluid conduit provides a bearing support feature, said bearing support feature in contact adjacency with the inner race of each bearing of said pair of bearings.

3. The tire pressure management system of claim 2, further comprising a bearing constraint in contact adjacency with a select bearing of the pair of bearings.

4. The tire pressure management system of claim 3, in which the bearing constraint is a first bearing constraint of the pair of bearing constraints, the select bearing is the first bearing of the pair of bearings and further comprising a second bearing constraint of the pair of bearing constraints, said second bearing constraint in contact adjacency with the second bearing of the pair of bearings, and wherein each bearing constraint is in pressing contact with said bearing sleeve.

5. The tire pressure management system of claim 4, further comprising an excess pressure collection chamber provided by the rotary union housing, said excess pressure collection chamber in adjacency with the exterior of the hubcap.

6. The tire pressure management system of claim 5, further comprising a pressure equalization structure, said pressure equalization structure disposed within the excess pressure collection chamber and in contact adjacency with the exterior of the hubcap.

7. The tire pressure management system of claim 6, in which the pressure equalization structure is a lip seal.

8. The tire pressure management system of claim 7, in which the pressure equalization structure is a filter medium.

9. The tire pressure management system of claim 8, in which the filter medium is formed from spun bonded polypropylene.

10. The tire pressure management system of claim 9, in which the filter medium is formed from the spun bonded polypropylene backed with a flashspun high-density polyethylene fiber.

11. The tire pressure management system of claim 1, in which the rotary union housing is formed from a rigid material.

12. The tire pressure management system of claim 11, in which the rigid material is a metallic.

13. The tire pressure management system of claim 11, in which the rigid material is a polymer.

14. The tire pressure management system of claim 13, further comprising a threaded insert, said threaded insert supported by said polymer rotary union housing and in fluid communication with said fluid distribution chamber.

15. The tire pressure management system of claim 14, in which said second seal provides a base portion, and further comprising a press plug, said press plug in contact adjacency with the base portion of said second seal, said press plug disposed between said external surface of said fluid conduit and said internal surface of said auxiliary bore, said second seal adjacent said interior of said hubcap.

16. The tire pressure management system of claim 15, in which said upstream end of said fluid conduit provides a fluid communication portion, said fluid communication portion extends beyond said attachment member and into said interior of said hubcap.

17. The tire pressure management system of claim 16, further comprising a fill tube secured to said fluid communication portion, said fill tube further in fluidic communication with said pressurized fluid.

18. The tire pressure management system of claim 17, in which said fill tube is a flexible fill tube, said flexible fill tube formed from a polymer.

19. The tire pressure management system of claim 18, in which said hubcap provides an attachment aperture, said attachment aperture disposed between said interior and said exterior of said hubcap, said attachment aperture providing an axis of rotation, said axis of rotation substantially aligned with an axis of said axle, said rotary union housing further provides at least an attachment member, said attachment member in mating communication with said attachment aperture.

* * * * *